June 5, 1951     J. G. O'NEIL     2,555,700
CONTAINER WITH SEALING LID
Filed April 8, 1946
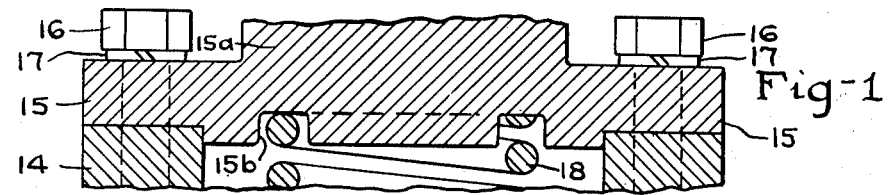
Fig.-1
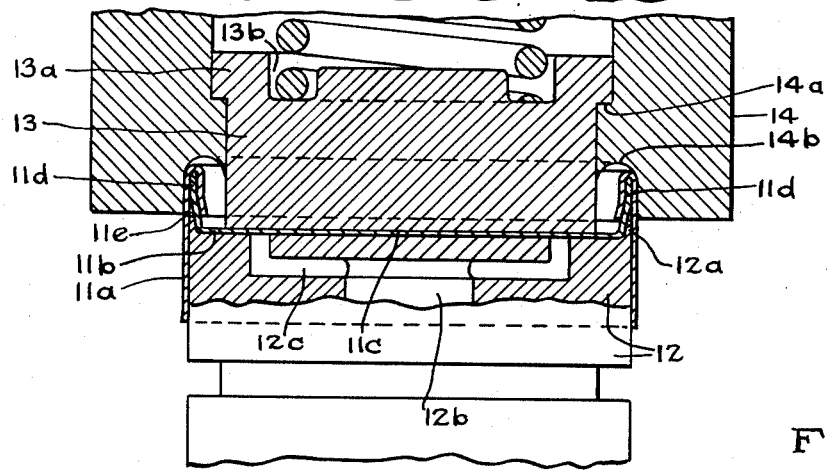
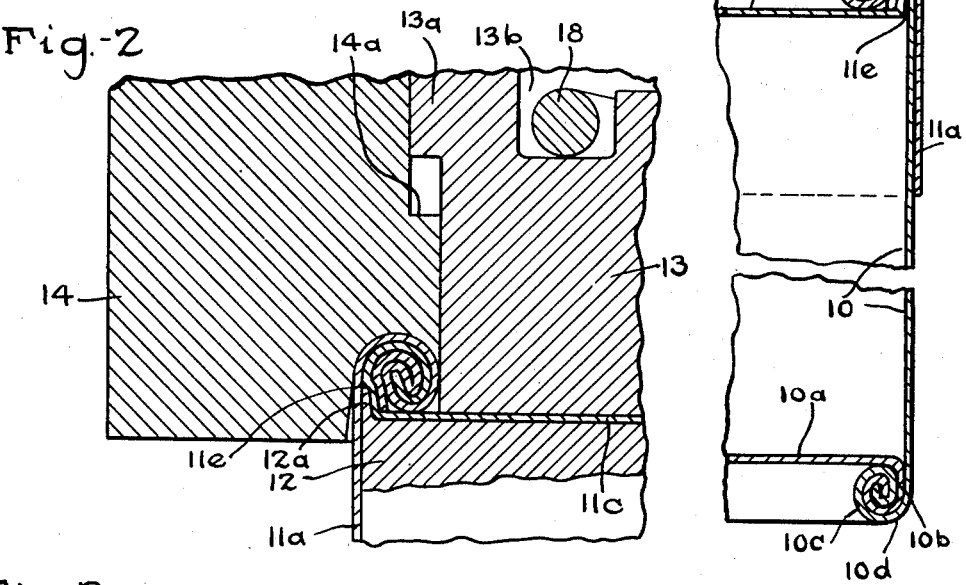
Fig.-2    Fig.-4
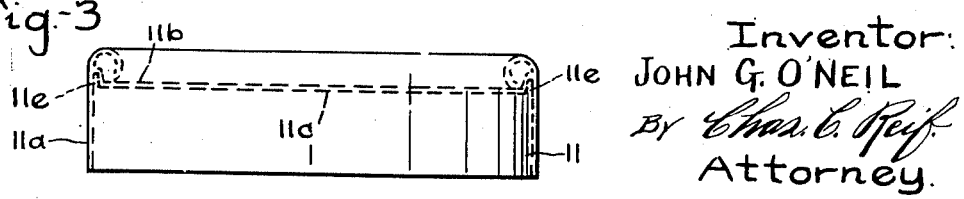
Fig.-3
Inventor:
JOHN G. O'NEIL
By Chas. C. Reif
Attorney.

Patented June 5, 1951

2,555,700

UNITED STATES PATENT OFFICE 2,555,700

CONTAINER WITH SEALING LID

John G. O'Neil, Faribault, Minn., assignor to O'Neil-Weinhagen, St. Paul, Minn., a partnership Application April 8, 1946, Serial No. 660,523

1 Claim. (Cl. 229—5.5)

This invention relates to a container and method of making the same. It is desirable in packing many products, such as various food products, to have a container which is provided with a lid which tightly seals the container.

It is an object of this invention to provide a container having a bottom and an open end, a lid having a flange fitting about said open end and having a top extending thereacross, said lid having a small groove extending about said top and some distance above the same into which the top of said container can be disposed and in which it tightly fits.

It is another object of the invention to provide a container structure comprising a cylindrical container made of sheet material such as a comparatively heavy paper or paper-like material, said container having bottom and an open end, a lid having a flange fitting about said open end and having a top extending thereacross, said lid also having a narrow annular groove extending about said top and a short distance above the same into which the said open end of said container may be forced and in which it tightly fits to seal said container.

It is also an object of this invention to provide a container structure comprising a container having a bottom and an open upper end, a lid having a projecting flange in which said open end of said container is received, said lid having a top extending thereacross and having a narrow annular groove about said top and extending a short distance thereabove, said groove preferably tapering upwardly in width and into which the open end of said container may be disposed and in which it tightly fits.

It is still further an object of the invention to provide a novel method for making the container above set forth.

These and other objects and advantages of the invention will be fully set forth in the following description made in connection with the accompanying drawings in which like reference characters refer to similar parts throughout the several views and in which—

Fig. 1 is a central vertical section through dies for forming said container showing a portion of said container therein;

Fig. 2 is a partial section similar to Fig. 1 shown on an enlarged scale and showing said dies in crimping position;

Fig. 3 is a view in side elevation of the lid used; and

Fig. 4 is a partial central vertical section through the container and lid, certain parts being broken away, said view being on an enlarged scale.

In performing the method of making said container, a container 10 is formed, and while this might be variously formed, in the embodiment of the invention illustrated it is shown as cylindrical. Container 10 has a bottom 10a which may be secured therein in any suitable manner. As shown, bottom 10a has a downwardly projecting flange 10b which with the projecting end 10c of container 10 is crimped into a compressed bead 10d. Bottom 10a thus tightly closes the lower end of the container. A lid 11 is provided for container 10 and the same has a downwardly projecting flange 11a which fits snugly about the upper open end of container 10. In forming lid 11 flange 11a is first made of cylindrical form and a cup-shaped member 11b is formed in any suitable manner, the same having a flat portion 11c extending thereacross and having also a flange 11d projecting upwardly therefrom, which flange is shown as cylindrical. The member 11b is placed within the cylindrical flange 11a and flange 11a is then placed upon a lower die 12 having a flat top surface engaged by portion 11c and having a cylindrical periphery engaged by flange 11a. Die 12 also has a thin annular flange 12a projecting upwardly from its top surface adjacent its periphery, the outer cylindrical surface of rib or flange 12a being flush with the periphery of die 12. Rib 12a preferably tapers upwardly slightly in thickness. An upper die is provided having a central portion 13 having a lower flat surface with a diameter slightly less than that of portion 11c. Die 13 has a narrow flange 13a at its upper end and said die fits within a bore of an outer die 14. Die 14 has a counterbore therein forming a shoulder 14a and within which counterbore flange 13a fits and is slidable. A head 15 is secured to die 14 by circumferentially spaced headed bolts 16. Lock washers 17 are shown beneath the heads of bolts 16. Head 15 has a central upwardly extending portion or stem 15a which will be connected to a reciprocating member of a press. A compression coiled spring 18 is disposed between die 13 and head 15, the upper end thereof seating in an annular groove 15b and its lower end seating in an annular groove 13b. The lower portion of die 14 which fits about die 13 is provided with an annular groove 14b having a substantially semi-circular upper end. Groove 14b extends at its inner side to the periphery of die 13 and said groove has an outer substantially cylindrical wall slightly greater in diameter than the outer diameter of flange 11a, which outer wall flares downwardly slightly. The portions 11a and 11b are placed on die 12 with dies 13 and 14 in elevated position. The upper end of flange 11a and flange 11d then extend vertically in substantially parallel relation. When head 15 moves downwardly, die 13 engages the top of portion 11c and holds it flat on the top of die 12. As head 15 continues to descend, spring 18 is compressed and die 14 moves downwardly along die 13. The upper end of flange 11a is turned downwardly and inwardly over flange 11d, as seen in Fig. 1. Die 14 continues to descend to the position shown in Fig. 2 and the upper end of flange 11a and the flange 11d are then rolled into and compressed into a tight bead, as shown in Fig. 2. The rib 12a maintains the lower portion of flange 11d separated slightly from the inner side of flange 11a so that an annular groove 11e is formed extending about the outer edge of top 11c and flange 11d, which groove extends upwardly a short distance. While the depth of groove of 11e can be varied, in practice with a container having a diameter of about 3½ inches said groove has been about ⅛ of an inch in depth. When head 15 is raised, dies 13 and 14 are raised and the lid can now be removed from die 12. In practice die 12 has been provided with a central opening 12b from which radial passages 12c extend which have upwardly extending ends opening through the top of die 12. After the lid is formed, compressed air is passed through opening 12b and passages 12c so that the lid is blown off of die 12.

The lid 11 now appears as shown in Fig. 3, and has the annular groove 11e extending about and above its top 11c. When the lid is placed on container 10, the upper open end of container 10 passes into groove 11e and can be rotated and pressed therein so that it fits very tightly in said groove. Groove 11e is of slightly less width for most of its extent than the thickness of the wall of container 10. When the end of the container is thus forced into groove 11e, a very tight fit is had between said end and lid 11. If it be attempted to separate lid 11 and container 10 rectilinearly, considerable resistance is encountered as a partial vacuum is created in container 10 which resists such separation. With the described structure therefore a very tight seal is provided between the lid and container and one which is air-tight. Such a seal is desired in containers used to pack many food products.

From the above description it will be seen that I have provided a novel and efficient structure of container and one which has a closure for tightly sealing the same. The structure is comparatively simple and the same can be easily and rapidly made. The container and method of making the same have been amply demonstrated in actual practice, found to be very successful and efficient and the same are being commercially manufactured. In practice the lid and container have been made of thick paper, preferably waterproofed. There is some yielding and resilient effect in such material so that the sides of groove 11e can yield as the end of the container is forced therein. This contributes to having a very tight seal in said groove and for said container.

It will of course be understood that various changes may be made in the form, details, arrangement and proportions of the device and in the steps and sequence of steps of the method without departing from the scope of applicant's invention, which, generally stated, consists in a method and device capable of carrying out the objects above set forth, such as disclosed and defined in the appended claim.

What is claimed is:

A container structure having in combination, a cylindrical container of stiff flexible material such as cardboard, a lid comprising a member of similar material of cup-shaped form having a top portion flat throughout its extent and having an integral upstanding cylindrical flange disposed thereabout substantially at right angles thereto, and a second member of cylindrical form having its upper end portion bent reversely downwardly over said flange, said flange and the parts of said cylindrical member at either side thereof being rolled inwardly into a tight substantially cylindrical bead which is compressed against said flat top and said cylindrical flange, said flange and the upper end of said second member being in contact at the upper part of said bead but diverging downwardly to form an upwardly tapering groove in which the upper end of said cylindrical container tightly fits to form a seal, said second member having tight fitting engagement with the outer side of said container and terminating a short distance below the top of said container.

JOHN G. O'NEIL.

REFERENCES CITED

The following references are of record in the file of this patent:

UNITED STATES PATENTS

| Number | Name | Date |
| --- | --- | --- |
| 995,953 | Comings | June 20, 1911 |
| 1,016,390 | Beadle | Feb. 6, 1912 |
| 1,325,930 | Drake | Dec. 23, 1919 |
| 1,644,506 | Bennett et al. | Oct. 4, 1927 |
| 1,700,742 | Moore | Feb. 5, 1929 |
| 1,997,188 | Gazette | Apr. 9, 1935 |
| 2,033,775 | Marshall | Mar. 10, 1936 |
| 2,076,407 | Mandell | Apr. 6, 1937 |
| 2,144,948 | Wallace | Jan. 24, 1939 |
| 2,343,716 | Toscano et al. | Mar. 7, 1944 |